US007943197B2

(12) United States Patent
Lieverz et al.

(10) Patent No.: US 7,943,197 B2
(45) Date of Patent: May 17, 2011

(54) PROCESS FOR PRODUCING TWO-TONE COATED SUBSTRATES

(75) Inventors: Frank Lieverz, Wuppertal (DE); Juergen Doebert, Sprockhoevel (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1042 days.

(21) Appl. No.: 10/760,870

(22) Filed: Jan. 20, 2004

(65) Prior Publication Data

US 2005/0158522 A1 Jul. 21, 2005

(51) Int. Cl.
*B05D 5/06* (2006.01)
*B05D 7/16* (2006.01)
*B05D 1/32* (2006.01)
*B05D 1/38* (2006.01)
*C08G 77/00* (2006.01)

(52) U.S. Cl. ........................................................ 427/282

(58) Field of Classification Search ................... 427/282
See application file for complete search history.

(56) References Cited

U.S. PATENT DOCUMENTS

| | | | | | |
|---|---|---|---|---|---|
| 4,741,932 | A | * | 5/1988 | Ichimura et al. | 427/407.1 |
| 4,965,098 | A | * | 10/1990 | Handa et al. | 428/203 |
| 5,384,367 | A | * | 1/1995 | Swarup et al. | 525/169 |
| 5,428,088 | A | * | 6/1995 | Yamamoto et al. | 524/147 |
| 5,547,757 | A | * | 8/1996 | Swarup et al. | 428/413 |
| 5,646,213 | A | * | 7/1997 | Guo | 524/562 |
| 5,709,909 | A | | 1/1998 | Leibfarth et al. | |
| 5,968,655 | A | | 10/1999 | Hartung et al. | |
| 5,976,343 | A | | 11/1999 | Schlaak | |
| 6,376,016 | B1 | | 4/2002 | Farquhar et al. | |
| 6,620,511 | B1 | * | 9/2003 | Wigger et al. | 428/413 |
| 2003/0017276 | A1 | | 1/2003 | Yamada et al. | |
| 2004/0175551 | A1 | * | 9/2004 | Dunlop et al. | 428/212 |

FOREIGN PATENT DOCUMENTS

| | | | | |
|---|---|---|---|---|
| JP | 11-239759 | A | * | 9/1999 |
| WO | WO 97/47401 | | | 12/1997 |

OTHER PUBLICATIONS

The International Search Report and Written Opinion of the International Searching Authority, Application No. PCT/US2005/003121, Mailed: Jul. 15, 2005.

* cited by examiner

*Primary Examiner* — William Phillip Fletcher, III
(74) *Attorney, Agent, or Firm* — Sudhir G. Deshmukh

(57) ABSTRACT

A process for producing two-tone coated substrates, comprising the successive steps:
a) providing a non-color-imparting pre-coated substrate,
b) applying a color-imparting coating of Color 1 at least to one or more regions of the substrate side facing an external observer,
c) curing the coating of Color 1,
d) masking the desired region of the coating of Color 1,
e) applying a color-imparting coating of Color 2 to the unmasked regions of the substrate side facing the external observer without deliberately curing the coating of Color 2,
f) unmasking the regions masked in step d),
g) applying a clear coat to the whole of the substrate side facing the external observer and
h) curing the clear coat.

6 Claims, No Drawings

PROCESS FOR PRODUCING TWO-TONE COATED SUBSTRATES

FIELD OF THE INVENTION

The invention relates to a process for producing two-tone coated substrates, in particular motor vehicle bodies.

BACKGROUND OF THE INVENTION

Present-day motor vehicle finishes consist in general of a multi-layer coating consisting of an anti-corrosive electrodeposition primer coating, a filler coat (primer surfacer coat) and, applied thereto, a top coat consisting of a color- and/or effect-imparting base coat and a protective, gloss-bestowing clear coat.

To produce two-tone multi-layer coatings, it is known to apply the color-imparting paint coat from two coating agents (coating compositions) of different colors, whereby an overlapping zone is deliberately created between the two regions of different colors. The overlapping zone is visible through a clear coat layer that is applied later.

If, instead of an overlapping zone, a sharp separation between the two regions of different colors is to be achieved, a conventional process used for forming a two-tone multi-layer coating provides for the masking of a single-tone multi-layer base/coat clear coat coating which leaves an unmasked region of the coating to be coated with a second color coating. This region then is further coated with a second color-imparting top coat or a second color- and/or effect-imparting base coat and a clear coat and then the mask is removed. An unwanted perceptible edge forms along the masking, which sharply delimits the regions of different colors from one another.

It would be desirable to have a process for forming a two-tone multi-layer coating that does not result in a visible overlapping zone or a perceptible edge between the colors.

SUMMARY OF THE INVENTION

The invention provides an economic process, i.e. one that can be carried out with a small number of curing or baking steps, for producing two-tone coated substrates, in particular motor vehicle bodies, wherein the regions of different colors are sharply delimited from one another and wherein the formation of a visible and perceptible edge between the regions of different colors is avoided.

The novel process of this invention forms two-tone coated substrates and comprises the following successive steps:

a) providing a non-color-imparting pre-coated substrate,
b) applying a color-imparting coating of Color 1 at least to one or more regions of the substrate side facing an external observer,
c) curing the coating of Colors 1,
d) masking the desired region of the coating of Colors 1,
e) applying a color-imparting coating of Color 2 to the unmasked regions of the substrate side facing the external observer without deliberately curing the coating of Colors 2,
f) unmasking the regions masked in step d),
g) applying a clear coat to the whole of the substrate side facing the external observer and
h) curing the clear coat.

DETAILED DESCRIPTION OF THE EMBODIMENTS

A particular embodiment of the process, according to the invention, relates to a process for producing two-tone coated motor vehicle bodies, comprising the following successive steps:

a) providing a non-color-imparting pre-coated motor vehicle body,
b) applying a color-imparting coating of Color 1 at least to one or more regions of the body outer skin,
c) curing the coating of Colors 1,
d) masking the desired region of the coating of Colors 1,
e) applying a color-imparting coating of Color 2 to the unmasked regions of the body outer skin without deliberately curing the coating of Colors 2,
f) unmasking the regions masked in step d),
g) applying a clear coat to the whole of the body outer skin and
h) curing the clear coat.

In the description and in the claims, reference is made to the substrate side facing an external observer, i.e. the visible outer surface. In the case of motor vehicle bodies this is the body outer skin. This in no way necessarily means that a coating of the side of the substrate facing away from the external observer or, in the particular case of motor vehicle bodies, regions of the body that are not directly accessible to the external observer, for example, motor, boot or passenger compartments, does not take place. In the present description, the nature of the coating of such substrate regions is simply not discussed; finally, this is also pointless given the nature of the invention.

In the description and in the claims, a distinction is made between "color-imparting" and "non-color-imparting", for example, between color-imparting coatings in Colors 1 and 2 and non-color-imparting coatings. By "color-imparting coatings" are meant the coatings that give the color impression of a finished, two-tone coated substrate to an external observer, i.e. the coatings of Colors 1 and 2 covered with the clear coat applied in step g). Colors 1 and 2 can both be either solid colors (single-tone colors) or special effect colors (colors characterized by color and/or brightness flop dependent on the angle of observation) or a solid color and a special effect color. The coating agents or coatings described as non-color-imparting do not contribute in the context of the present invention to the color impression of a finished, two-tone coated substrate; they can naturally consist of a colored or a non-colored paint.

In process step a) a non-color-imparting, pre-coated substrate is provided, for example, a plastic substrate pre-coated with conductive primer, a metal substrate pre-coated with an anti-corrosive primer or a pre-coated substrate made from a combination of different materials, for example, from metal and plastic parts. The non-color-imparting pre-coating is in every case a cured pre-coating. The pre-coating covers at least the whole of the substrate side facing the external observer. In the case of a pre-coated motor vehicle body, the pre-coating in general consists of a conventional electrodeposition primer coating, optionally together with a further, likewise non-color-imparting coating applied thereto, for example, a conventional filler coat. The production of corresponding pre-coatings is known to the person skilled in the art and therefore does not require further explanation.

In process step b) a color-imparting coating of Color 1 is applied from a coating agent of Color 1 at least to one or more regions of the pre-coated substrate side facing the external observer, for example, regions of the pre-coated body outer skin, preferably by spray application. The expression "at least to one or more regions" means that at least that or those regions that are to appear in Color 1 on the finished substrate (target regions), and are therefore masked in process step d), are coated. Since an exact limitation of the application of the coating agent of Color 1 to the target regions is as a rule not possible, particularly with spray application, the application of the coating agent of Color 1 will cover in each case slightly larger regions than merely the target regions, and at least exceed them to such an extent that a coating of the target regions with the coating composition of Color 1 in a coat thickness meeting the respective specification is guaranteed. As a result, at least one region of the pre-coated substrate side facing the external observer is coated in Color 1 and the remaining region(s) are left uncoated.

It is also possible to coat in Color 1 the whole of the pre-coated substrate side facing the external observer, for example, the whole of the pre-coated body outer skin; in the context of the process according to the invention only the region which is masked in process step d) will however be understood as coated so as to impart color.

As a further alternative it is possible to coat in Color 1 that or those regions which are to be coated in Color 1 on the finished substrate and are therefore masked in process step d), and to coat the remaining regions of the substrate side facing the external observer, using a further, non-color-imparting coating agent. The coating agent of Color 1 and the further, non-color-imparting coating agent can moreover be applied separately and in any order after one another or with an overlap in time. For example, they can also be applied simultaneously using a plurality of application equipment, e.g., multiple spray nozzles. In each case, they will be applied in a single coating step without a drying or curing occurring between the two applications. The formation of overlapping zones of the coating composition of Color 1 and the further, non-color-imparting coating composition will take place, with the overlapping zones lying outside the regions that appear in Color 1 on the finished substrate.

The coating of Color 1 can be applied by any coating systems known per se to the skilled man, in particular ones conventional in the coating of motor vehicles and in particular ones which are chemically curable (cross-linkable). Liquid solvent- and/or water-based coating systems, powder coatings or aqueous powder coating dispersions can be involved.

Conventional solvent-containing or aqueous filler paints, such as those used in the coating of motor vehicles, of Color 1 or conventional base coat systems of Color 1 which fulfill both filler coat functions (e.g., stone-chipping resistance, equalization of the substrate surface) and base coat functions (color- and/or effect-imparting) are particularly suitable in the case of motor vehicle bodies only pre-coated with an electrodeposition primer coating. The base coat systems are preferably aqueous base coat systems.

In the description and in the claims, either base coats are referred to or a distinction is made in connection with the above-mentioned base coat systems between unmodified base coats and modified base coats.

If only base coats are referred to, the conventional color- and/or effect-imparting base coat coating agents (solid-colored base coats; special effect base coats which are color- and effect imparting or only effect-imparting because of their content of effect imparting agents, such as aluminum pigments or interference pigments) known to the person skilled in the art are meant. These are, in particular, aqueous base coats, such as are conventionally used to produce the tone-determining base coat layer of color- and/or effect-imparting base coat/clear coat two-layer finishes.

Conversely, in the case of the base coat systems already discussed a system consisting of modified base coat and, applied thereto, unmodified base coat is meant. Whereas, the unmodified base coats are the already mentioned conventional base coat coating compositions known to the person skilled in the art, the modified base coat systems are produced from the latter by mixing with an admixture component. Preferably, the admixture component causes the base coats modified with it to acquire typical filler coat properties (stone-chipping resistance, equalization of the substrate surface). Admixture components suitable for such a modification of base coats are known from WO 97/47401, U.S. Pat. Nos. 5,976,343, 5,709,909 and 5,968,655. Said patent documents describe processes for producing decorative multi-layer coatings in which a multi-layer coating structure consisting of a modified base coat, a subsequently applied unmodified base coat and a finally applied clear coat is produced on a baked electrodeposition primer coating by the wet-in-wet-in-wet method. The modified base coat applied first of all is in said process produced from the subsequently applied base coat by the addition of an admixture component and replaces the function of a conventional filler coat. Whereas, WO 97/47401 recommends the addition of polyisocyanate cross-linking agent, in U.S. Pat. No. 5,976,343, the addition of polyurethane resin or in U.S. Pat. Nos. 5,709,909 and in 5,968,655, the addition of a filler paste (extender paste) as admixture component is described. The base coat systems of modified and unmodified base coats that are described in the above-mentioned patent documents are examples of base coat systems usable in the process according to the invention. Reference is therefore made explicitly but not restrictively to said patent documents.

If a base coat system of Color 1 is used in the process, according to the invention, it includes at least a modified base coat. In particular, in the case of special effect Colors 1, the base coat systems include also preferably the corresponding unmodified base coats from which, as explained above, the modified base coats applied beforehand are produced by mixing with an admixture component. In the case of solid Colors 1, it is sufficient and preferable to apply only the modified base coat; conversely, in the case of special effect Colors 1, it is preferable to apply both the modified special effect base coat and subsequently, the unmodified special effect base coat to the uncured coat of the modified special effect base coat. Whereas, the modified base coats are preferably applied by electrostatic high-speed rotary application, the unmodified base coats are in the case of a special effect base coat preferably applied pneumatically.

It may be explicitly pointed out at this point that coatings of Colors 1 produced with the base coat systems described are understood as a single coating layer of Color 1 irrespective of whether they have been produced only from modified base coats or by a combination of modified base coats applied first of all and unmodified base coats applied thereto subsequently.

In the case of motor vehicle bodies pre-coated with an electrodeposition primer coating and with a filler coat, in general, the base coat systems described above are not used. Instead, preferably conventional, i.e., unmodified base coats of Color 1 are then used.

As regards the nature of the coating compositions which do not comprise the Color 1 and which are optionally used for non-color-imparting coating in process step b), there applies mutatis mutandis what is stated regarding the coating compositions of Color 1. It is preferable, if the coating compositions are compatible with the coating compositions of Color 1, in particular, if they differ only slightly from the latter in their composition, for example, are merely of different pigmentation and belong to inherently the same coating system.

The coating compositions of Color 1 and the optionally applied non-color-imparting coating compositions are applied in a dry film thickness in the range of, for example, 8 to 50 μm. In the case of the base coat systems of modified and unmodified base coats, the dry film thickness is the sum of the two individual coat thicknesses.

In process step c), the coating applied from the coating composition of Color 1 and optionally, of the one further, non-color-imparting coating composition in process step b) is in general first of all exposed to the air, or in the case of powder coatings or powder coating dispersions fused on, before the actual curing takes place. Curing is carried out in general by the supply of thermal energy, for example, by baking and/or by irradiation with infrared and/or near-infrared radiation. The curing temperature taking effect during the supply of thermal energy and the duration of the temperature effect are determined by the chemistry of the binder system in the coating composition of Color 1 used or in the coating compositions used.

In process step d), the desired region of the coating of Color 1, i.e., the region of the cured coating, which is to appear in Color 1 on the finished two-tone coated substrate, is masked. The masking is carried out with the conventional means known to the person skilled in the art, for example, by covering and/or preferably by lining.

In process step e), a coating of Color 2 is applied in a dry film thickness of, for example, 8 to 50 μm to the unmasked regions of the substrate side facing the external observer, for example, the body outer skin, in particular by spraying. The application of the coating of Color 2 happens without deliberately curing it, i.e., a subsequent curing step is not performed. In other words, a curing of the coating of Color 2 is not deliberately effected and in general does not take place in process step e).

The coating of Color 2 can be applied by any coating systems known per se to the person skilled in the art, in particular, conventional ones for the coating of motor vehicles, in particular, chemically curable ones. Liquid solvent- and/or water-based coating systems are in particular involved.

Conventional, i.e., unmodified base coats of Color 2 or base coat systems of Color 2 are in particular suitable for motor vehicle bodies, wherein there applies mutatis mutandis in both cases, as regards the nature of the coating compositions and also their actual application (without curing), what was already said above in connection with process step b) for the base coats and base coat systems of Colors 1.

After unmasking in process step f), a clear coat is applied in process step g) to a dry film thickness of, for example, 25 to 70 μm to the whole of the substrate side facing the external observer, in the case of motor vehicle bodies to the whole of the body outer skin, i.e., the clear coat is applied in the region of the coating of Color 1 to a cured coating, while for the region of Color 2 in general a wet-in-wet application of the clear coat to an uncured coating takes place.

Any clear coat compositions can be used to produce the clear coat layer. Suitable, in principle as clear coat, are all known clear coats, which can be cured thermally and/or by exposure to high-energy radiation, for example, UV radiation. Solvent-containing single-component (1C) or two-component (2C) clear coats, water-thinnable 1C or 2C clear coats, powder clear coats or aqueous powder clear coat dispersions can be used here.

In the final process step h) the curing of the clear coat and in general also that of the coating of Color 2 takes place. The nature of the curing depends in particular on the clear coat system used. In the case of clear coats curable by exposure to high-energy radiation, in particular UV radiation, the curing is effected by corresponding irradiation. In the case of thermally curable clear coats, the curing is effected by the supply of thermal energy, for example, by baking and/or by irradiation with infrared or near-infrared radiation. In the case of clear coats curable thermally and curable by exposure to high-energy radiation, so-called dual-cure clear coats, the curing is effected both by the supply of thermal energy and by corresponding irradiation.

The process according to the invention produces substrates coated in two tones on their side facing an external observer, the multi-layer coating structure of which, as explained in further detail below by Examples 1 to 8, can be different in character. In the case of motor vehicle bodies, there is provided, both in the region of Color 1 and in the region of Color 2, between electrodeposition primer and clear coat, at least one coating layer which performs filler coat functions, for example, a filler coat counting as pre-coating or applied in process step b) or a modified base coat applied in process step b) and/or e).

Below are shown in tabular form some preferred examples of two-tone finishes that can be produced on substrates with the process according to the invention avoiding the formation of a noticeable edge between the Color 1 and Color 2 areas. Examples 1, 3, 5, 6 and 7 are particularly preferred in relation to motor vehicle bodies. Unless a distinction is explicitly made between solid-colored base coat and special effect base coat in the examples, the term "base coat" means special effect base coat or solid-colored base coat. For example, Example 5 thus includes four variants of two-tone finishes (Color 1: solid color/Color 2: solid color; Color 1: solid color/Color 2: special effect color; Color 1: special effect color/Color 2: solid color; Color 1: special effect color/Color 2: special effect color).

EXAMPLES

| | Multi-layer coating structure of the area appearing in Color 1 | Multi-layer coating structure of the area appearing in Color 2 |
|---|---|---|
| Example 1 | | |
| Applied in process step g) | Clear coat | Clear coat |
| Applied in process step e) | — | Unmodified base coat of Color 2 |
| Applied in process step b) | Unmodified base coat of Color 1 | — |
| Pre-coating | Filler coat on electrodeposition coating | Filler coat on electrodeposition coating |
| Example 2 | | |
| Applied in process step g) | Clear coat | Clear coat |

-continued

| | Multi-layer coating structure of the area appearing in Color 1 | Multi-layer coating structure of the area appearing in Color 2 |
|---|---|---|
| Applied in process step e) | — | Unmodified base coat of Color 2 |
| Applied in process step b) | Filler coat of Color 1 | Filler coat of Color 1 |
| Pre-coating | Electrodeposition coating | Electrodeposition coating |
| Example 3 | | |
| Applied in process step g) | Clear coat | Clear coat |
| Applied in process step e) | — | Unmodified base coat of Color 2 |
| Applied in process step b) | Filler coat of Color 1 | Non-color-imparting filler coat |
| Pre-coating | Electrodeposition coating | Electrodeposition coating |
| Example 4 | | |
| Applied in process step g) | Clear coat | Clear coat |
| Applied in process step e) | — | Base coat system of Color 2 consisting of unmodified base coat on modified and previously applied base coat produced from the unmodified base coat by mixing with an admixture component |
| Applied in process step b) | Filler coat of Color 1 | — |
| Pre-coating | Electrodeposition coating | Electrodeposition coating |
| Example 5 | | |
| Applied in process step g) | Clear coat | Clear coat |
| Applied in process step e) | — | Base coat system of Color 2 consisting of unmodified base coat on modified and previously applied base coat produced from the unmodified base coat by mixing with an admixture component |
| Applied in process step b) | Base coat system of Color 1 consisting of unmodified base coat on modified and previously applied base coat produced from the unmodified base coat by mixing with an admixture component | — |
| Pre-coating | Electrodeposition coating | Electrodeposition coating |
| Example 6 | | |
| Applied in process step g) | Clear coat | Clear coat |
| Applied in process step e) | — | Modified base coat system of solid Color 2 produced from unmodified solid-colored base coat by mixing with an admixture component |
| Applied in process step b) | Base coat system of special effect Color 1 consisting of unmodified special effect base coat on modified and previously applied special effect base coat produced from the unmodified special effect base coat by mixing with an admixture component | — |
| Pre-coating | Electrodeposition coating | Electrodeposition coating |
| Example 7 | | |
| Applied in process step g) | Clear coat | Clear coat |

-continued

| | Multi-layer coating structure of the area appearing in Color 1 | Multi-layer coating structure of the area appearing in Color 2 |
|---|---|---|
| Applied in process step e) | — | Base coat system of special effect Color 2 consisting of unmodified special effect base coat on modified and previously applied special effect base coat produced from the unmodified special effect base coat by mixing with an admixture component |
| Applied in process step b) | Modified base coat of solid Color 1 produced from unmodified solid-colored base coat by mixing with an admixture component | — |
| Pre-coating | Electrodeposition coating | Electrodeposition coating |
| Example 8 | | |
| Applied in process step g) | Clear coat | Clear coat |
| Applied in process step e) | — | Modified base coat of solid Color 2 produced from unmodified solid-colored base coat by mixing with an admixture component |
| Applied in process step b) | Modified base coat of solid Color 1 produced from unmodified solid-colored base coat by mixing with an admixture component | — |
| Pre-coating | Electrodeposition coating | Electrodeposition coating |

Example 9

(Production of a Light Blue (Solid Color 1)/Dark Blue Special Effect Color 2) Two-Tone Multi-Layer Coating of the Type of Example 7

One half of a steel panel 30 cm×60 cm in size and provided with a cathodic electrodeposition primer coating is coated in a dry film thickness of 30 μm by electrostatic high-speed rotary application with a modified light blue solid-colored aqueous base coat (produced by mixing light blue aqueous base coat, Herberts Aqua Base, R 76013 with a polyisocyanate-containing modifying admixture component, R 65400, in the ratio by weight 10:1; both from DuPont Performance Coatings GmbH & Co. KG, Wuppertal). A light blue overspray zone is produced in the other half of the panel at the same time.

The whole is then exposed to the air for 5 minutes at 20° C., pre-dried for 5 minutes at 80° C. and baked for 20 minutes at 140° C.

The half of the panel painted light blue is then lined and the non-lined half of the panel is coated in a dry film thickness of 16 μm by electrostatic high-speed rotary application with a modified dark blue special effect aqueous base coat (produced by mixing dark blue special effect aqueous base coat, Herberts Aqua Base, R 76079 with a polyisocyanate-containing modifying admixture component, R 65400, in the ratio by weight 10:1; both from DuPont Performance Coatings GmbH & Co. KG, Wuppertal) and then in a dry film thickness of 6 μm with the unmodified dark blue special effect aqueous base coat (Herberts Aqua Base, R 76079) by means of pneumatic application. After exposure to air for 5 minutes at 20° C. and pre-drying for 5 minutes at 80° C., the lining is removed from the light-blue painted half of the panel and the whole panel is spray-coated in a dry film thickness of 40 μm with a two-component clear coat (produced by mixing 100 parts by wt of base R 40473 and 30 parts by wt of polyisocyanate-containing hardener R 65430; both from DuPont Performance Coatings GmbH & Co. KG, Wuppertal). After exposure to air for 5 minutes at 20° C., baking was carried out for 20 minutes at 140° C.

The resulting panel has a two-tone light blue/dark blue coating and does not have a noticeable edge between the light blue and dark blue areas.

What is claimed is:

1. Process for producing two-tone coated substrates, consisting of the successive steps:

a) providing a non-color-imparting pre-coated substrate, wherein said substrate is precoated with an electrodeposition primer, b) directly applying a color-imparting coating of Color 1 over at least one or more regions of the pre-coated substrate side facing an external observer, c) curing the coating of Color 1, d) masking the desired region of the coating of Color 1, e) applying a color-imparting coating of Color 2 to the unmasked regions of the substrate side facing the external observer without deliberately curing the coating of Color 2, f) unmasking the regions masked in step d), g) applying a clear coat to the whole of the substrate side facing the external observer and h) curing the clear coat wherein the color-imparting coating of Color 1 applied in step b) is applied from a coating composition selected from the group consisting of a modified solid-colored base coat and said modified solid-colored base coat applied first of all and an unmodified solid-colored base coat applied subsequently and the color-imparting coating of Color 2 applied in step e) is applied from a coating composition selected from the group consisting of a modified special effect base coat and said modified special effect base coat applied first of all and an unmodified special effect base coat applied subsequently, wherein the modified solid-colored base coats used in steps b) and wherein the modified special effect base coat e) are in each case produced by mixing of an unmodified solid-colored base coat with an admixture component and an unmodified special effect base coat with said admixture component, wherein the admixture component is selected from the group consisting of polyisocyanate crosslinking agents, polyurethane resins and filler pastes.

2. The process of claim 1, wherein the substrates are motor vehicle bodies and the substrate side facing an external observer is the body outer skin.

3. The process of claim 1, wherein in step b) the whole of the substrate side facing the external observer is coated with the coating composition of Color 1 or the region(s) to be masked in step d) is (are) coated with the coating composition of Color 1 and the remaining region(s) of the substrate side facing the external observer is (are) coated with a non-color-imparting coating composition or is (are) left uncoated.

4. The process of claim 1, wherein the substrate is pre-coated with an electrodeposition primer and both the color-imparting coating of Color 1 applied in step b) and the color-imparting coating of Color 2 applied in step e) are applied from an unmodified base coat.

5. A process for producing two-tone coated substrates, consisting of the successive steps:

i) providing a non-color-imparting pre-coated substrate, wherein said substrate is precoated with an electrodeposition primer,
j) directly applying a color-imparting coating of Color 1 over at least one or more regions of the pre-coated substrate side facing an external observer,
k) curing the coating of Color 1,
l) masking the desired region of the coating of Color 1,
m) applying a color-imparting coating of Color 2 to the unmasked regions of the substrate side facing the external observer without deliberately curing the coating of Color 2,
n) unmasking the regions masked in step d),
o) applying a clear coat to the whole of the substrate side facing the external observer and
p) curing the clear coat wherein the color-imparting coating of Color 1 applied in step b) is applied from a coating composition selected from the group consisting of a modified special effect base coat and said modified special effect base coat applied first of all and an unmodified special effect base coat applied subsequently and the color-imparting coating of Color 2 applied in step e) is applied from a coating composition selected from the group consisting of a modified solid-colored base coat and said modified solid-colored base coat applied first of all and an unmodified solid-colored base coat applied subsequently, wherein the modified special effect base coats used in steps b) and wherein the modified solid-colored base coat e) are in each case produced by mixing of an unmodified solid-colored base coat with an admixture component and an unmodified special effect base coat with said admixture component, wherein the admixture component is selected from the group consisting of polyisocyanate crosslinking agents, polyurethane resins and filler pastes.

6. A process for producing two-tone coated substrates, consisting of the successive steps:

q) providing a non-color-imparting pre-coated substrate, wherein said substrate is precoated with an electrodeposition primer,
r) directly applying a color-imparting coating of Color 1 over at least one or more regions of the pre-coated substrate side facing an external observer,
s) curing the coating of Color 1,
t) masking the desired region of the coating of Color 1,
u) applying a color-imparting coating of Color 2 to the unmasked regions of the substrate side facing the external observer without deliberately curing the coating of Color 2,
v) unmasking the regions masked in step d),
w) applying a clear coat to the whole of the substrate side facing the external observer and
x) curing the clear coat wherein the color-imparting coating of Color 1 applied in step b) is applied from a coating composition selected from the group consisting of a modified special effect base coat and said modified special effect base coat applied first of all and an unmodified special effect base coat applied subsequently and the color-imparting coating of Color 2 applied in step e) is applied from a coating composition selected from the group consisting of a modified special effect base coat and said modified special effect base coat applied first of all and an unmodified special effect base coat applied subsequently, wherein the modified special effect base coats used in steps b) and e) are in each case produced by mixing of an unmodified special effect base coat with an admixture component, wherein the admixture component is selected from the group consisting of polyisocyanate crosslinking agents, polyurethane resins and filler pastes.

* * * * *